(12) United States Patent
Tomaru (10) Patent No.: US 7,365,895 B2
(45) Date of Patent: Apr. 29, 2008

(54) DISPLAY DEVICE

(75) Inventor: Yuichi Tomaru, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 153 days.

(21) Appl. No.: 11/452,906

(22) Filed: Jun. 15, 2006

(65) Prior Publication Data

US 2007/0008467 A1    Jan. 11, 2007

(30) Foreign Application Priority Data

Jun. 15, 2005  (JP) .............................. 2005-174705
May 26, 2006  (JP) .............................. 2006-146443

(51) Int. Cl.
*G02F 1/03* (2006.01)
*G02F 1/29* (2006.01)
*G09F 19/00* (2006.01)
*G09F 19/14* (2006.01)
*G09G 3/34* (2006.01)

(52) U.S. Cl. ................... 359/260; 359/240; 359/242; 359/245; 359/261; 359/317; 359/318; 359/228; 40/453; 40/438; 430/508; 345/107; 345/84

(58) Field of Classification Search ................ 359/228, 359/240, 242, 245, 237, 238, 260, 261, 263, 359/278, 315–318, 451, 452, 577, 578, 589, 359/590, 608; 349/114, 141; 362/26; 40/406, 40/409, 436, 438, 453, 545, 546, 552, 577; 430/396, 496, 508, 962; 345/48, 55, 84, 345/85, 107; 250/227.11

See application file for complete search history.

(56) References Cited

U.S. PATENT DOCUMENTS 1,579,597 A * 4/1926 Craig .......................... 40/438
2,355,902 A * 8/1944 Berg ........................... 40/453
3,134,674 A * 5/1964 Brown, Jr. ................... 430/508
3,491,245 A * 1/1970 Hardesty ............... 250/227.11
4,419,663 A * 12/1983 Kohashi ..................... 345/107
5,956,005 A * 9/1999 Sheridon ...................... 345/84
7,292,222 B2 * 11/2007 Ahn et al. ................... 345/107

FOREIGN PATENT DOCUMENTS

JP        2001-174719 A      6/2001
WO    WO 02/082042 A2   10/2002

* cited by examiner

*Primary Examiner*—Loha Ben
(74) *Attorney, Agent, or Firm*—Sughrue Mion, PLLC (57) ABSTRACT

A display device comprising the following arranged from light input side in the order listed below: a first reflector having a semi-transmissive and semi-reflective property; a translucent porous body having a plurality of pores in which a translucent material is filled, each of the pores having a substantially smaller diameter than the wavelength of input light; and a second reflector having a perfect reflection property, or a semi-transmissive and semi-reflective property. The average complex refractive index of the translucent porous body is changeable with respect to each display dot, and the wavelength of light absorbed by the translucent porous body is changeable with respect to each display dot according to the average complex refractive index. In this way, the input light is modulatable, and the modulated light is outputted from the first reflector and/or the second reflector to perform image display.

14 Claims, 5 Drawing Sheets

DISPLAY DEVICE

BACKGROUND OF THE INVENTION

1. Field of the Invention

The present invention relates to a display device that performs image display by modulating input light with respect to each display dot and outputting the modulated light.

2. Description of the Related Art

As one of the optical modulation devices that modulate light by absorbing light having a particular wavelength, interference filters, such as etalon filter and the like, are put into practical use. The conventional interference filters require a high degree of smoothness and accuracy for the thickness of the film, making them difficult to manufacture and requiring high costs, in particular, those with large display area. In addition, the optical modulation property is fixed due to the rigid structure. Thus, different interference filters are required for different wavelengths to be absorbed (transmitted), which has been an obstacle for flexibly responding to design changes in optical systems.

Under these circumstances, International Patent Publication No. WO2002/082042 discloses an optical modulation device with a porous body having pores (nodes) with a diameter of 1.0 to 1.6 µm in which a fluid is filled. The optical modulation device has a pore diameter which is greater than the wavelength of the input light, forming a photonic crystal structure, and performs optical modulation by the interference effect of the photonic crystal structure.

Japanese Unexamined Patent Publication No. 2001-174719 discloses an optical modulation device with a case having a pair of transparent walls disposed spaced apart in the optical path. The distance between the walls is adjustable, and the case is filled with a fluid. In the optical modulation device, multipath reflection (resonance) occurs between the pair of transparent walls. Consequently, multipath interference occurs, and light having a particular wavelength is absorbed, thereby the light is modulated.

Each of the optical modulation devices described in the aforementioned patent publications may alter the optical modulation property by changing the fluid filled therein, but it is difficult for them to achieve fine and high resolution optical modulation.

Under the circumstances described above, the inventor of the present invention has conducted research work and invented a new optical modulation device which allows fine and high resolution optical modulation with changeable optical modulation property. Further, the device is easy to manufacture, and those with a large display area may be manufactured. The inventor of the present invention has continued the research work and found that the optical modulation device described above is applicable as a new display device in which image display is performed by modulating input light with respect to each display dot and outputting the modulated light. Neither of the patent publications described above mentions the applicability of the device as a display device. What is more, there has been no such idea itself as to applying the optical modulation devices, such as interference filter and the like, to a display device in the past.

As one of the display devices that perform image display by modulating input light with respect to each display dot and outputting the modulated light, a liquid crystal device is known. The liquid crystal device includes a pair of base plates, each with an electrode, disposed opposite to each other with a liquid crystal layer interposed therebetween. In the liquid crystal device, specifically polarized light is inputted to the liquid crystal layer through a polarizer, and the light transmitted through the liquid crystal layer is outputted to the viewer again through the polarizer. Thus, a certain amount of light is absorbed by the polarized, and the light utilization efficiency is degraded by that much. Further, in order to provide full color display using the liquid crystal device, a color filter is required which absorbs a certain amount of light and the light utilization efficiency is degraded by that much.

In contrast, the new display device discovered by the present inventor is capable of performing image display without using any polarizer, and providing full color display without using any color filter. That is, the present invention provides a new and novel display device having higher light utilization efficiency than the conventional liquid crystal device.

SUMMARY OF THE INVENTION

A display device of the present invention comprises the following arranged from light input side in the order listed below:

a first reflector having a semi-transmissive and semi-reflective property;

a translucent porous body having a plurality of pores in which a translucent material is filled, each of the pores having a substantially smaller diameter than the wavelength of input light; and a second reflector having a perfect reflection property, or a semi-transmissive and semi-reflective property, wherein:

the average complex refractive index of the translucent porous body is changeable with respect to each display dot;

the wavelength of light absorbed by the translucent porous body is changeable with respect to each display dot according to the average complex refractive index, and thereby the input light is modulatable; and the modulated light is outputted from the first reflector and/or the second reflector to perform image display.

The referent of "semi-transmissive and semi-reflective property" as used herein means having both translucency and reflectivity, and may have any transmittance and reflectance values. The referent of "substantially smaller diameter than the wavelength of input light" as used herein means less than or equal to ½ of the shortest wavelength of the input light. The referent of "average complex refractive index of the translucent porous body" as used herein means the average complex refractive index obtained by adding the complex refractive index of the translucent porous body to the complex refractive index of the material within the pores thereof (translucent material if filled, or air if no translucent material is filled therein), and averaging the total.

In the display device of the present invention, the average complex refractive index of the translucent porous body may be changed with respect to each display dot either automatically or manually.

The referent of "display dot" as used herein means the smallest display unit switchable to on or off state. If the device is a black and white device or a monocolor device, a single pixel is constituted by a single display dot, and if it is a full color device, a single pixel is constituted by a plurality of display dots that output different color lights, such as R (red), G (green), or B (blue).

In the display device of the present invention, a configuration may be adopted in which the complex refractive index of the translucent material filled in the pores is changeable with respect to each display dot, and the average complex refractive index of the translucent porous body is changeable with respect to each display dot by changing the complex refractive index of the translucent material.

In the display device of the present invention, a configuration may be adopted in which the type and/or amount of the translucent material filled in the pores is changeable with respect to each display dot, and the average complex refractive index of the translucent porous body is changeable with respect to each display dot by changing the type and/or amount of the translucent material.

The referent of "changing the type of the translucent material" as used herein means changing the density of the translucent material without changing the components thereof, as well as changing the components.

Preferably, in the display device of the present invention, the pores are substantially linear pores extending from the side of the first reflector toward the side of the second reflector. Here, a single display dot may be constituted by a single pore, or by a plurality of pores.

In a preferred embodiment of the display device of the present invention, the translucent porous body is constituted by a metal oxide body obtained by anodizing a portion of an anodizable metal body, the second reflector is constituted by the non-anodized portion of the anodizable metal body, and the first reflector is constituted by a metal layer formed on the translucent porous body.

In a further preferred embodiment of the display device of the present invention, the translucent porous body is constituted by a metal oxide body obtained by anodizing the entire portion of an anodizable metal body, or anodizing a portion of an anodizable metal body and removing the non-anodized portion thereof, and each of the first and second reflectors is constituted by a metal layer formed on the translucent porous body.

The display device of the present invention comprises the following arranged from light input side in the order listed below: a first reflector having a semi-transmissive and semi-reflective property; a translucent porous body having a plurality of pores with a substantially smaller diameter than the wavelength of input light in which a translucent material is filled; and a second reflector having a perfect reflection property, or a semi-transmissive and semi-reflective property, and the average complex refractive index of the translucent fine body is changeable with respect to each display dot.

In such structure, the light transmitted through the first reflector and entered into the translucent porous body repeats reflections between the first and second reflectors, causing multipath refection to occur effectively. This causes multipath reflection interference to be developed effectively, and the light absorption property for absorbing light having a particular wavelength is produced. The input light is modulated by the light absorption effect and the modulated light is outputted from the first reflector and/or the second reflector.

The multipath interference condition varies according to the average complex refractive index of the first reflector, average complex refractive index of the second reflector, and average complex refractive index and thickness of the translucent porous body. In the structure according to the present embodiment in which the average complex refractive index of the translucent porous body may be changed with respect to each display dot, the multipath interference condition may be changed with respect to each display dot. Therefore, an image may be displayed by changing the optical modulation property with respect to each display dot, and outputting the modulated light according to the average complex refractive index of the translucent porous body.

The display device of the present invention has a strong light absorption property for a particular wavelength due to multipath interference. This allows high resolution optical modulation to be performed with respect to each display dot. Further, the device has a structure which is substantially smaller than the wavelength of the input light as the smallest optical modulation unit, and a single display dot may be constituted by a single or a plurality of pores having a diameter which is substantially smaller than the wavelength of the input light. Thus, according to the present invention, a display device with high resolution and high display quality may be provided.

The display device of the present invention structurally has a wavelength selection capability, so that it may perform image display without using any polarizer, and provide full color display without using any color filter. That is, the display device has higher light utilization efficiency than the conventional liquid crystal device.

DESCRIPTION OF THE PREFERRED EMBODIMENTS

First Embodiment

Figure 1:
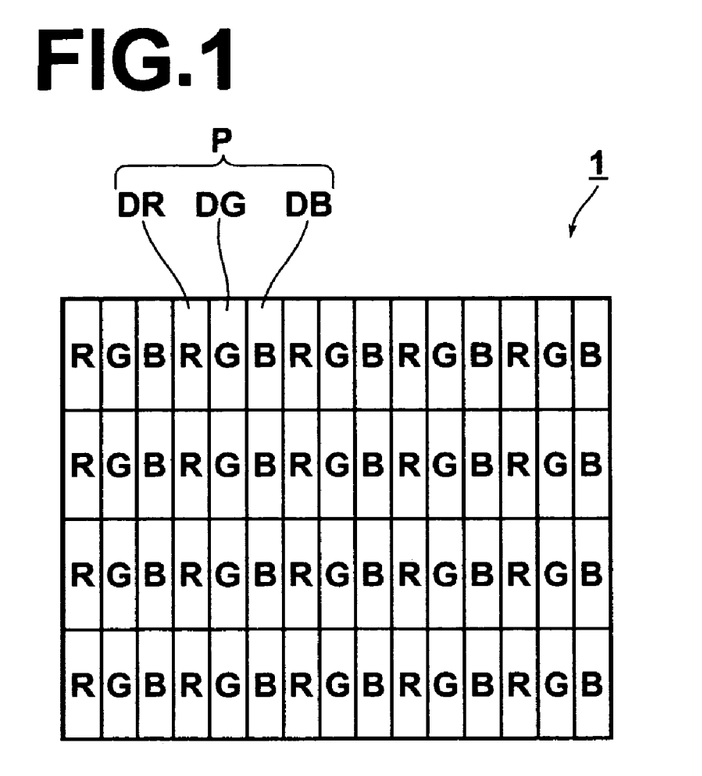
FIG. 1 is a plan view illustrating the pixel pattern of the display device according to a first embodiment of the present invention.
Figure 2A:
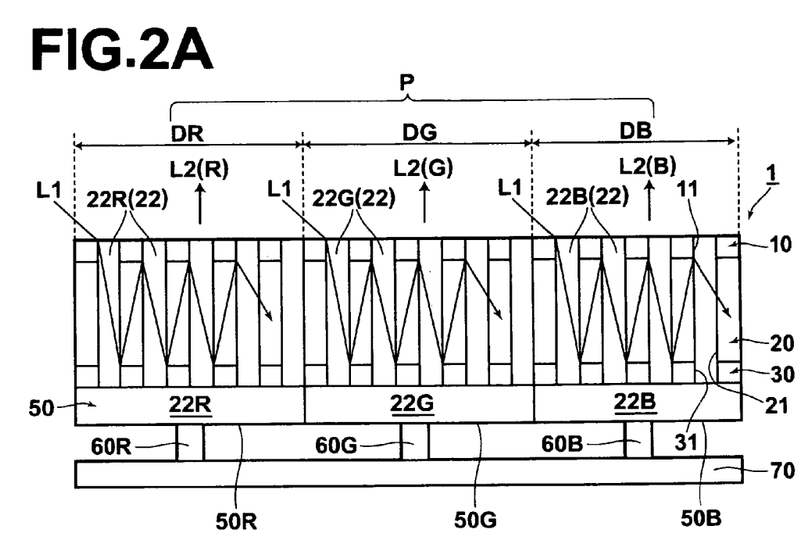
FIG. 2A is a thickness cross-sectional view of a single pixel of the display device according to the first embodiment of the present invention.
Figure 2B:
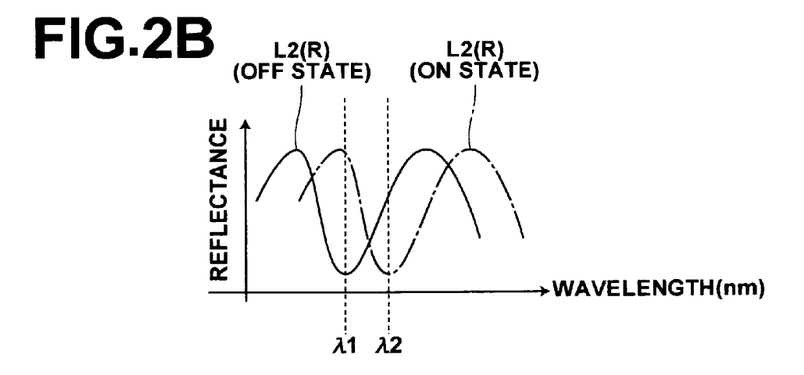
FIG. 2B is a drawing illustrating example spectra of modulated light of the display device shown in FIG. 2A.

Hereinafter, the structure of the display device according to a first embodiment of the present invention will be described with reference to FIGS. 1 to 3. FIG. 1 is a plan view illustrating the pixel pattern of the present display device 1. FIG. 2A is a thickness cross-sectional view of a single pixel of the display device 1 according to the present embodiment (hatching is omitted). FIG. 2B shows example spectra of the modulated light. FIGS. 3A to 3C are drawings (perspective views) illustrating the manufacturing process of the display device 1 according to the present embodiment.

As shown in FIG. 1, the display device 1 according to the present embodiment is a full color device with multitudes of pixels disposed in a matrix. Each of the pixels includes a display dot DR for outputting red light (within a wavelength range from 625 to 740 nm), a display dot DG for outputting green light (within a wavelength range from 500 to 565 nm), and a display dot GB for outputting blue light (within a wavelength range from 450 to 485 nm). The arrangement pattern of the display dots DR, DG, DB is not limited to that shown in FIG. 1, and they may be arranged arbitrarily as appropriate. A configuration may be adopted in which a black matrix (BM) that does not involve image display is provided between adjacent display dots DR, DG, DB.

The display device 1 may perform image display using external light (white light), such as sunlight, room light, or the like, as input light L1. It is also possible to mount a light source, such as backlight, frontlight, or the like, to use the light for display. In this case, the wavelength distribution of the input light L1 may be designed arbitrarily as appropriate.

As shown in FIG. 2, the display device 1 has a device structure that includes the following arranged from light input side (upper side in FIG. 2A) in the order listed below: a first reflector 10 having a semi-transmissive and semi-reflective property; a translucent porous body 20; and a second reflector 30 having a semi-transmissive and semi-reflective property.

Figure 3A:
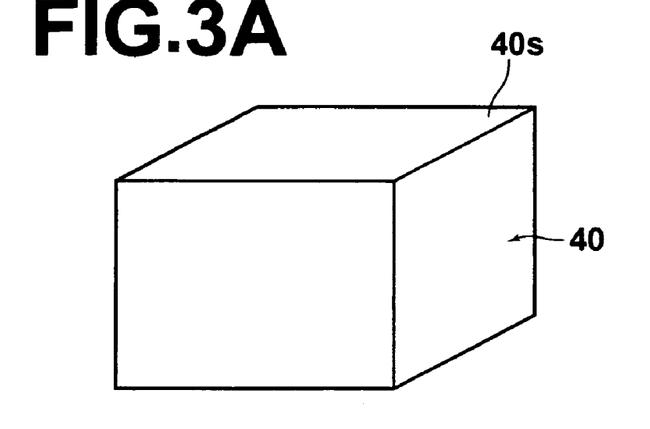
FIGS. 3A to 3C are drawings illustrating the manufacturing process of the display device shown in FIG. 2A.
Figure 3B:
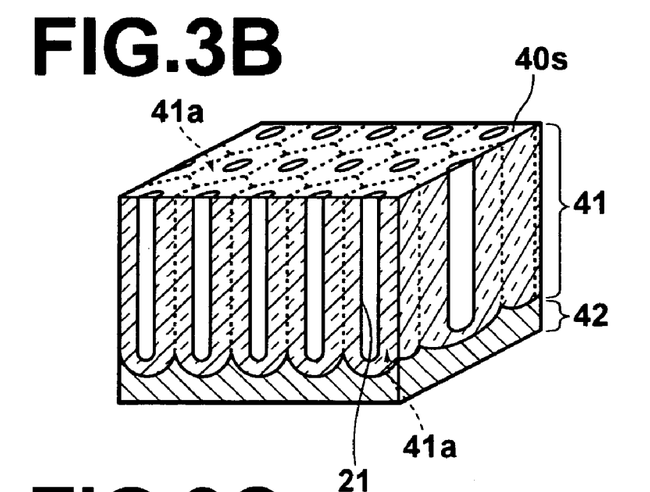
Figure 3C:
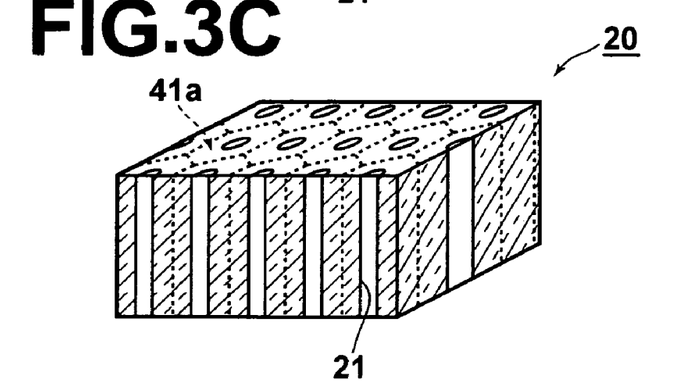

As shown in FIGS. 2A and 3C, the translucent porous body 20 is made of alumina ($Al_2O_3$, translucent metal oxide) with a plurality of pores 21 formed therein that extend substantially linearly from the side of the first reflector 10 to the side of the second reflector 20. Each of the plurality of pores 21 runs through the translucent porous body 20, and is open at the face on the side of the first reflector 10 and at the face on the side of the second reflector 30. In the translucent porous body 20, the plurality of pores 21 is disposed substantially regularly with a significantly smaller pore diameter and an arrangement pitch than the wavelength of the input light L1.

In the present embodiment, translucent material 22 may move in and out of the pores 21. There is no specific limitation on the translucent material. In view of causing the translucent material 22 to freely move in and out, however, a fluid material, i.e. liquid, liquid crystal, or the like, is preferable as the translucent material 22. Liquid materials include inorganic solvent such as water or the like, organic solvent such as alcohol (methanol, ethanol, or the like), a mixture of these, and various solutions constituted by inorganic and/or organic solvents with solutes such as glycerol, sucrose, and the like mixed therein. Further, a gas may be used as the translucent material 22.

A single display dot is formed by a plurality of pores, and different translucent materials 22 (having different complex refractive indices) are filled in the display dots DR, DG, DB that output light of different colors. In FIG. 2A, the translucent materials 22 filled in the display dots DR, DG, DB are indicated by reference symbols 22R, 22G, 22B respectively.

In the present embodiment, the display device 1 is designed such that red, green and blue lights are outputted respectively from the dots DR, DG, DB by changing the type of the translucent materials 22 filled in the pores 21 of the display dots DR, DG, DB. Further, the amount of translucent materials to be filled in the pores is controllable with respect to each of the display dots DR, DG, DB, thereby grayscale display is realized.

As shown in FIGS. 3A to 3C, the translucent porous body 20 is manufactured from an aluminum-based anodizable metal body 40 that may contain impurities (preferably, a purity degree of not less than 90%), in which a portion of the metal body 40 is anodized, and then the non-anodized portion 42 of the metal body 40 and the adjacent area thereof are removed by etching.

Anodization is implemented by immersing the anodizable metal body 40 together with cathode in an electrolyte solution with the metal body 40 as anode, and applying a voltage between the anode and cathode. There is no specific limitation on the geometry of the anodizable metal body 40, but a plate-like shape or the like is preferable. Further, the metal body 40 may include a base, on which anodizable metal is formed as a layer or the like. Carbon or aluminum is used as the cathode. There is no specific limitation on the type of the electrolyte solution, and an acid electrolyte solution that contains one or more acids selected from the group consisting of sulfuric acid, phosphoric acid, chromium acid, oxalic acid, sulfamic acid, benzenesulfonic acid, amidosulfonic acid, and the like is preferably used.

As shown in FIG. 3B, when the anodizable metal body 40 is anodized, oxidizing reaction proceeds from the surface 40$s$ in the direction substantially perpendicular to the surface 40$s$, and the metal oxide body ($Al_2O_3$) 41 is formed. The metal oxide body 41 formed by the anodization has a structure that includes a multitude of fine column bodies 41$a$ disposed without any gap with substantially a hexagonal shape when viewed from above. Each of the pores 21 extending substantially linearly in the depth direction from the surface 40$s$ is formed at the approximate center of each of the column bodies 41$a$, and the bottom of each of the column bodies 41$a$ has a rounded surface. The structure of a metal oxide body formed by the anodization is described, for example, in Material Technology Vol. 15, No. 10, p 34, 1997.

Preferable examples of the anodization conditions when oxalic acid is used as the electrolyte solution includes: electrolyte solution density of 0.5M; solution temperature from 14 to 16 degrees Celsius; and application voltage of 40±0.5V. The pores 21 formed under these conditions have, for example, a pore diameter of 30 to 95 nm with a pitch of around 100 nm.

The translucent porous body 20 may also be produced by totally anodizing the anodizable metal body 40 without the non-anodized portion 42.

Both of the first reflector 10 and second reflector 30 are made of a metal layer formed on the translucent porous body 20 by metal vapor deposition. The translucent porous body 20 has a plurality of pores running therethrough, and no metal is formed on the aperture areas so that the first reflector 10 and the second reflector 30 have a plurality of through-holes 11, 31 respectively, each communicating with each of the plurality of pores 21 of the translucent porous body 20 as shown in FIG. 2A. The through-holes 11, 31 are formed in the same pattern as the pores 21 of the translucent porous body 20, so that the through-holes 11, 31 are disposed substantially regularly with a significantly smaller diameter and an arrangement pitch than the wavelength of the input light L1.

The first reflector 10 and second reflector 30 may be made of the same material or different materials. There is no specific limitation on the material of the first reflector 10 and second reflector 30 as long as it is a metal having a light reflection property. For example, Au, Ag, Cu, Al, or alloys of these metals may be used. The first reflector 10 and second reflector 30 may include two or more different metals and any non-metal elements as impurities.

In the present embodiment, a translucent cell 50 is bonded to the second reflector 30. The surface of the translucent cell 50 facing to the second reflector 30 allows passage of the translucent material 22. The translucent cell 50 includes cell chambers 50R, 50G, SOB separated in the same pattern as the display dots DR, DG, DB, and the translucent materials 22R, 22G, 22B are filled in the cell chambers 50R, 50G, 50B respectively. Pumps 60R, 60G, 60B are connected to the cell chambers 50R, 50G, 50B respectively for pumping the translucent materials 22R, 22G, 22B therein. The Pumps 60R, 60G, 60B are connected to a single controller 70, and drive controlled with respect to each of the display dots DR, DG, DB.

There is no specific limitation on the pumps 60R, 60G, 60B. For example, electrohydrodynamic pump, electro-osmosis pump, electrophoretic pump, thermocapillary pump, electro-wetting pump, electrocapillary pump, or the like may be used. Further, the type of the pump may be changed with respect to each of the display dots.

In the display device 1 of the present embodiment, each of the translucent materials 22R, 22G, 22B filled in each of the cell chambers 50R, 50G, 50B is forced out by each of the pumps 60R, 60G, 60B and injected into the pores 21 of the translucent porous body 20 with respect to each of the display dots DR, DG, DB, and the injection amount of the translucent materials is also regulated. The translucent materials 22R, 22G, 22B may be injected in the through-holes 11 of the first reflector 10 and/or the through-holes 31 of the through-holes 31 of the second reflector 30 as well as the pores 21 of the translucent porous body 20. FIG. 2A illustrates an example case in which a maximum amount of each of the translucent materials 22R, 22G, 22B is filled with respect to each of the display dots DR, DG, DB, i.e. each of the translucent materials 22R, 22G, 22B is filled in the through-holes 11 of the first reflector 10, and the through-holes 31 of the second reflector 30, as well as the pores 21 with respect to each of the display dots DR, DG, DB.

In the translucent porous body 20, a plurality of pores 21 is formed with a significantly smaller diameter and an arrangement pitch than the wavelength of the input light L1. This causes the translucent porous body 20 to behave as a thin film for light due to what is known as an electromagnetic mesh shielding effect either before or after the translucent materials 22R, 22G, 22B are filled.

Similarly, in the first reflector 10 and second reflector 30, the through-holes 11, 31 are formed with a significantly smaller diameter and an arrangement pitch than the wavelength of the input light L1. This causes the first reflector 10 and the second reflector 30 either before or after the translucent materials 22R, 22G, 22B are filled in the through-holes 11, 31 acts as a thin film.

The first reflector 10 and the second reflector 30 are made of a reflective metal, but have the through-holes 11, 31, so that the reflectors have a semi-transmissive and semi-reflective property. The transmittance and reflectance of the first reflector 10 depend on the quality and thickness of the material used, and the aperture density of the through-holes. The transmittance and reflectance of the second reflector 30 are also dependent on the quality and thickness of the material used, and the aperture density of the through-holes.

As shown in FIG. 2A, when the input light L1 is incident on the display device 1, a portion of the light is reflected at the surface of the first reflector 10 (not shown) and the other portion of the light transmits through the first reflector 10 and enters into the translucent porous body 20 in accordance with the transmittance and reflectance of the first reflector 10. The light entered into the translucent porous body 20 repeats reflections between the first reflector 10 and second reflector 30. That is, the display device 1 has a resonance structure in which multipath reflection occurs between the first reflector 10 and the second reflector 30.

In such device, multipath reflection interference occurs, and the absorption property for selectively absorbing light having a particular wavelength is produced. The multipath interference condition depends on the average complex refractive index of the first reflector 10, average complex refractive index of the second reflector 30, and average complex refractive index and thickness of the translucent porous body 20. Therefore, light having a particular wavelength is absorbed according to these factors.

The input light L1 is modulated by the light absorption effect described above and the modulated light L2 is outputted. In particular, if at least any of the reflector 10, translucent porous body 20, or second reflector 30 is constituted by a light absorption body with the imaginary part of the complex dielectric constant thereof is other than zero, then a sharp absorption peak is obtained, that is, a strong light absorption property for absorbing light having a particular wavelength may be produced. In the present embodiment, the first reflector 10 and second reflector 30, which are metal layers, are light absorption bodies with the imaginary part of the complex dielectric constant thereof is other than zero.

Preferably, the display device 1 has a device structure in which the optical impedance is matched to maximize the number of multipath reflection times (finesse F). Generally, the finesse F is expressed by the following formula, and the greater the reflectance R, the greater the finesse F and sharper the absorption peak.

$$\text{Finesse} F = \pi R^{1/2}/(1-R)$$

In the display device 1 according to the present embodiment, different translucent materials 22R, 22G, 22B (having different complex refractive indices) are injected for the display dots DR, DG, DB. Consequently, the average complex refractive index of the translucent porous body 20 when filled with the translucent materials 22 differs with respect to each of the display dots DR, DG, DB. Thus, the peak wavelength $\lambda$ of the light absorbed by the multipath interference differs with respect to each of the display dots DR, DG, DB.

When the input light L1 is normal incident light, the following are assumed. That is, the average complex refractive index of the first reflector 10 is $n_1-ik_1$, average complex refractive index of the translucent porous body 20 is $n_2$, average complex refractive index of the second reflector 30 is $n_3-ik_3$, and thickness of the translucent porous body 20 is d. (where, $k_1$, $k_2$ are extinction coefficients, $-ik_1$ and $-ik_3$ indicate imaginary parts, and, the imaginary part of the complex refractive index of the translucent body 20 is zero in the present embodiment)

The inventor of the present invention has found that peak wavelength (absorption peak wavelength) $\lambda$ of the light absorbed by the multipath interference at any display dot at any timing depends largely on the average complex refractive index $n_2$ and thickness d of the translucent porous body 20, and is basically expressed by the following formula. That is, the inventor of the present invention has found that the absorption peak wavelength $\lambda$ appears near the wavelength expressed by the following formula, which varies around the wavelength expressed by the following formula according to the average complex refractive index $n_1-ik_1$ of the first reflector 10, average complex refractive index $n_3-ik_3$ of the second reflector 30, and average complex refractive index $n_2$ and thickness d of the translucent porous body 20.

$$n_2 d \approx (m+1)/2 \times \lambda$$

$$\lambda \approx (m+1) \times 2 n_2 d$$

where, m is an arbitrary integer value (0, ±1, ±2, or the like).

The multipath interference condition varies with the average complex refractive index of the first reflector 10, average complex refractive index of the second reflector 30, and average complex refractive index and thickness of the translucent porous body 20 (average complex refractive index of the translucent porous body 20 varies according to the complex refractive indices of the translucent materials 22R, 22G, 22B and the amounts filled therein). Thus, these factors are designed such that red light, green light, and blue light are outputted from the display dots DR, DG, DB respectively when the translucent materials 22 are filled.

The average complex refractive index $n_2$ of the translucent porous body 20 varies with the amount of translucent material 22 filled in the pores 21. Thus, if an attention is given to a single display dot, the dot is the darkest state (OFF state) when the pores 21 thereof is empty, and the brightest state when it is maximally filled with the translucent material 22 (ON state). Therefore, grayscale display may be realized by regulating the amount of translucent materials 22 filled in the pores 21.

In the present embodiment, the average complex refractive index of the translucent porous body 20 is changed by moving in and out the translucent materials 22R, 22G, 22B with respect to the display dots DR, DG, DB as described above. The wavelength of the light absorbed thereby is changed according to the average complex refractive index and the input light L1 is modulated. Consequently, modulated lights L2 (R), L2 (G), and L2 (B) are outputted from the display dots DR, DG, DB respectively to the viewer, thereby the image is displayed. The modulated lights L2 (R), L2 (G), and L2 (B) are dark lights during OFF state in which no translucent materials 22R, 22G, 22B are filled, and are red, green and blue lights respectively during ON state in which the translucent materials 22R, 22G, 22B are filled.

In the present embodiment, both the first reflector 10 and second reflector 30 have a semi-transmissive and semi-reflective property. This causes the display device 1 to be a reflective type device in which the modulated light L2 is outputted from the first reflector 10, a transmissive type device in which the modulated light L2 is outputted from the second reflector 30, or a semi-transmissive and semi-reflective type device in which the modulated light L2 is outputted both from the first reflector 10 and second reflector 30 according to the average complex refractive index of the first reflector 10, average complex refractive index of the second reflector 30, and average complex refractive index and thickness of the translucent porous body 20. FIG. 2A illustrates a reflective device. The display device 1 may be used as the reflective device, translucent device, or semi-transmissive and semi-reflective device as required.

There is no specific limitation on the thickness d of the translucent porous body 20. Preferably, however, the thickness d is, for example, not greater than 300 nm, in which case only a single absorption peak wavelength exists in the visible light wavelength range.

Example spectra ($\lambda 1$, $\lambda 2$ indicate absorption peak wavelengths) of the modulated light L2 (R) under reflective device type conditions when the display dot DR is in the darkest state (OFF state) in which no translucent material 22 R is filled, and when it is in the brightest state (ON state) in which the translucent material 22 R is maximally filled are shown in FIG. 2B. The FIG. 2B illustrates that the absorption peak wavelength varies with the condition whether the translucent material 22 R is filled or not, and thereby the spectrum of the modulated light L2 (R) varies to ON or OFF state. The same is true with the display dots DG, DB.

The display device 1 is structured in the manner as described above.

That is, the display device 1 according to the present embodiment has a device structure that includes the following arranged from the light input side in the order listed below: the first reflector 10 having a semi-transmissive and semi-reflective property, translucent porous body 20 having a plurality of pores with a substantially smaller diameter than the wavelength of the input light L1 in which the translucent materials 22 (22R, 22G, 22B) are filled, and second reflector 30 having a semi-transmissive and semi-reflective property. This structure allows the average complex refractive index of the translucent porous body 20 to be changeable with respect to each of the display dots DR, DG, DB.

In such structure, the light transmitted through the first reflector 10 and entered into the translucent porous body 20 repeats reflections between the first reflector 10 and second reflector 30, causing multipath refection to occur effectively. This causes multipath reflection interference to be developed effectively and the absorption property for absorbing light having a particular wavelength is produced. The input light L1 is modulated by the light absorption effect and the modulated light L2 is outputted from the first reflector 10 and/or the second reflector 30.

The multipath interference condition varies according to the average complex refractive index of the first reflector 10, average complex refractive index of the second reflector 30, and average complex refractive index and thickness of the translucent porous body 20. Therefore, light having a particular wavelength is absorbed according to these factors. In the structure according to the present embodiment in which the average complex refractive index of the translucent porous body 20 is changeable with respect to each of the display dots DR, DG, DB, the multipath interference condition may be changed with respect to each of the display dots DR, DG, DB. Therefore, an image may be displayed by changing the optical modulation property with respect to each of the display dots DR, DG, DB, and outputting the modulated light L2 according to the average complex refractive index of the translucent porous body 20.

The display device 1 according to the present invention that includes the translucent porous body 20 having a plurality of pores 21 arranged regularly has excellent in-plane uniformity of the light modulation structure, which allows stable image display over the entire surface of the device. Further, the device has a strong light absorption property for a particular wavelength due to multipath interference. This allows high resolution optical modulation to be performed with respect to each of the display dots DR, DG, DB. Further, the device has a structure which is substantially smaller than the wavelength of the input light L1 as the smallest optical modulation unit, and each of the display dots DR, DG, DB is constituted by a plurality of pores having a diameter which is substantially smaller than the wavelength of the input light L1. Thus, according to the present embodiment, the display device 1 with high resolution and high display quality may be stably provided.

In the present embodiment, a single display dot DR, DG, or DB may be constituted by a single pore 21, in which case the number of pixels becomes the greatest.

The display device 1 according to the present embodiment structurally has a wavelength selection capability, so that it may perform image display without using any polarizer, and provide full color display without using any color filter. That is, the display device 1 has higher light utilization efficiency than the conventional liquid crystal device. High light utilization efficiency allows brighter display than the conventional liquid crystal device when compared using the input light having the same intensity.

In the present embodiment, multipath reflection interference occurs effectively, and fine and high-resolution optical modulation is realized with respect to each of the display dots DR, DG, DB. There is no specific limitation on the number of light reflections within the translucent porous body 20, and it may be an arbitrary smaller number as long as it provides the interference condition of the reflected light.

In the present embodiment, the description has been made in which the display device 1 is structured to move in and out the translucent material 22 from the side of the reflector 30, but the present invention is not limited to this. A plurality of pores 21 constituting the translucent porous body 20 extends from the first reflector 10 to the second reflector 30. These pores are formed substantially linearly and are open at the face on the side of the first reflector 10 and at the face on the side of the second reflector 30, and the first reflector 10 and second reflector 30 have through-holes 11, 31 respectively which are formed in the same pattern as the pores 21 of the translucent porous body 20. This arrangement allows the translucent material 22 to be moved in and out from the side of the first reflector 10 and/or second reflector 30, and the type and/or amount of translucent material 22 may be changed with respect to each of the display dots DR, DG, DB.

The display device 1 according to the present embodiment has a structure in which the translucent porous body 20 is interposed between the two reflectors 10, 30, which may be readily manufactured through anodization, and the display device 1 with an enlarged display area may also be readily manufactured.

The display device 1 according to the present embodiment structurally has a wavelength selection capability, as in the first embodiment, so that it is resistant to degradations (color degradation and the like) and has an excellent stability for long term use.

In the present embodiment, a configuration is adopted in which the type of translucent materials 22 filled in the different display dots DR, DG, DB that output different color lights is changed, and the amount of translucent material 22 is regulated with respect to each of the display dots DR, DG, DB. But the present invention is not limited to this, and an image may be displayed if the average complex refractive index of the translucent porous body 20 is made changeable with respect to each of the display dots DR, DG, DB.

That is, (1) the average complex refractive index of the translucent porous body 20 may be changed with respect to each of the display dots DR, DG, DB by making the type and/or amount of the translucent material 22 filled in the pores 21 of the translucent porous body 20 changeable with respect to each of the display dots DR, DG, DB, thereby image display may be performed. The "change in the type of translucent material 22" means to include changing the components of the translucent material 22, and changing the density without changing the components.

Description has been made in which a single display dot is filled only with a single type of translucent material 22, but a configuration may be adopted in which a single display dot is filled with different translucent materials 22 according to timings for turning on or off the display dot or realizing grayscale display.

If the translucent material 22 is liquid crystal or the like, (2) the average complex refractive index of the translucent porous body 20 may also be made changeable with respect to each of the display dots DR, DG, DB by electrically changing the complex refractive indices of the translucent materials filled in the pores 21 of the translucent porous body 20 with respect to each of the display dots DR, DG, DB. In this case, by forming a passive matrix type or active matrix type electrodes and drive structure as in the conventional liquid crystal device using the first reflector 10 and second reflector 30 as the electrodes, the drive control with respect to each of the display dots DR, DG, DB may be implemented. When liquid crystal is used as the translucent material 22 for the display device of the present invention, and the display device is drive controlled in the same manner as in the conventional liquid crystal device, the display device of the present invention has a totally different display mechanism from that of the conventional liquid crystal device so that image display may be realized without using a polarizer or a color filter.

The average complex refractive index of the translucent porous body 20 may also be changed by combining structures described in (1) and (2) above. Further, (3) the thickness of the translucent porous body 20 may be changed depending on the display dots DR, DG, DB in accordance with the structure (1) and/or structure (2) to change the multipath interference condition with respect to each of the display dots DR, DG, DB. Still further, (4) aperture ratio of the pores 21 (=total aperture area/total area of the translucent porous body 20) may be changed depending on the display dots DR, DG, DB by changing the diameter of the pores 21 or the like to change the multipath interference condition with respect to each of the display dots DR, DG, DB.

In the present embodiment, a full color device has been described. But, the present embodiment may also be applied to a monocolor device, or a black and white device by forming a single pixel with a single display dot.

Second Embodiment

Figure 4A:
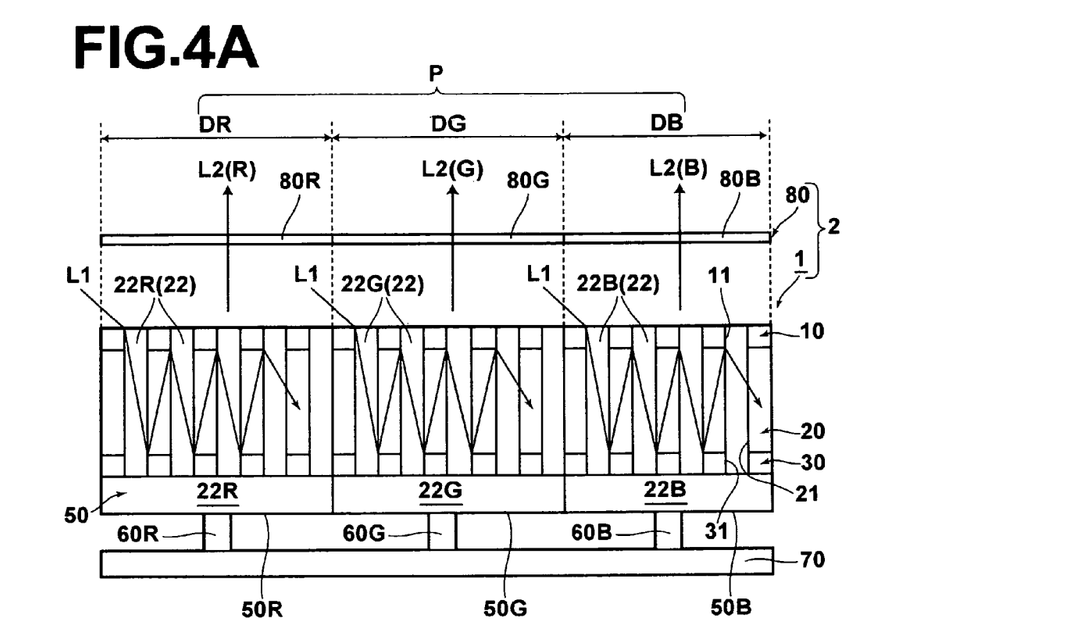
FIG. 4A is a thickness cross-sectional view of a single pixel of the display device according to a second embodiment of the present invention.
Figure 4B:
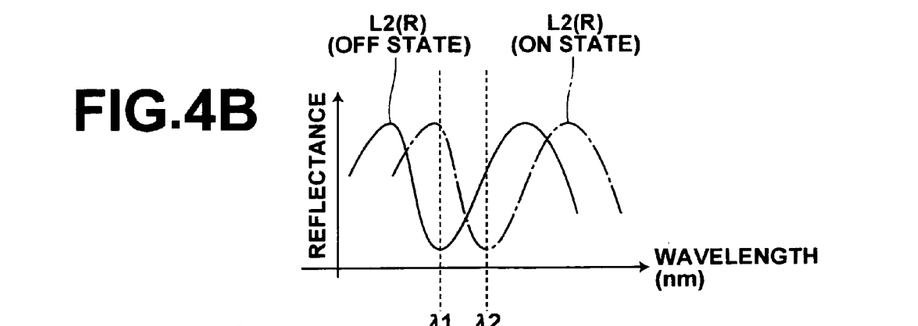
FIG. 4B is a drawing illustrating example spectra of modulated light (before entering a bandpass filter) of the display device shown in FIG. 4A.
Figure 4C:
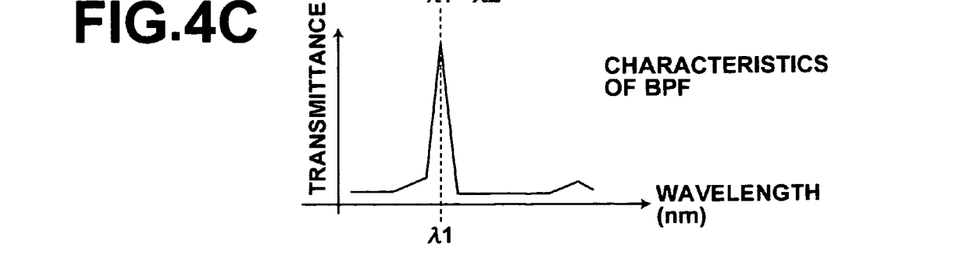
FIG. 4C is a drawing illustrating an example spectrum that indicates the transmission characteristics of the bandpass filter.

Hereinafter, the structure of the display device according to a second embodiment of the present invention will be described with reference to FIGS. 4A to 4C. The basic structure of the present embodiment is identical to that of the first embodiment. Therefore, identical components are given the same reference symbols and will not be elaborated upon further here. FIG. 4A is a cross-sectional view of the present embodiment corresponding to FIG. 2A in the first embodiment. FIG. 4B shows example spectra of the modulated light (before bandpass filter), and FIG. 4C is an example spectrum illustrating the transmission characteristics of a bandpass filter. In the present embodiment, a reflective type device will be described as an example.

As shown in FIG. 4A, the display device 2 according to the present embodiment includes a bandpass filter (BPF) 80 provided on the light output side (on the side of the first reflector 10) of the display device 1 according to the first embodiment described above. The bandpass filter 80 is constituted by three different microfilters 80R, 80G, 80B formed in a pattern corresponding to the display dots DR, DG, DB, each selectively transmitting light having a particular wavelength.

Here, a configuration is adopted in which the input light L1 is incident on the first reflector 10 without passing through the bandpass filter 80, and modulated light L2 is outputted from the reflector 10 to the viewer through the badpass filter 80.

Example spectra of the modulated light L2 (R) (identical to those shown in FIG. 2B in the first embodiment) outputted from the reflector 10 and before entering the microfilter 80R when the display dot DR is in the darkest state (OFF state) and brightest state (ON state) are shown in FIG. 4B. An example spectrum that indicates the transmission characteristics of the bandpass filter is shown in FIG. 4C.

The microfilter 80R is designed to selectively pass the light with an absorption peak wavelength $\lambda 1$ of the modulated light L2 (R) in OFF state, and the modulated light L2 (R) is absorbed by the microfilter 80R and not outputted to the viewer in OFF state. The modulated light L2 (R) in ON state includes a large amount of light having the wavelength $\lambda 2$, so that the modulated light L2 (R) is transmitted through the microfilter 80R to the viewer and visually recognized in ON state. The same is true with the display dots DG, DB.

According to the display device 2 of the present embodiment, images may be displayed in the same manner as in the display device 1 of the first embodiment. Further, the present embodiment includes a bandpass filter that selectively transmits the light with an absorption peak wavelength of the modulated light L2 in OFF state. This allows the on/off contrast to be enhanced since no light is outputted to the viewer during OFF state.

Third Embodiment

Figure 5A:
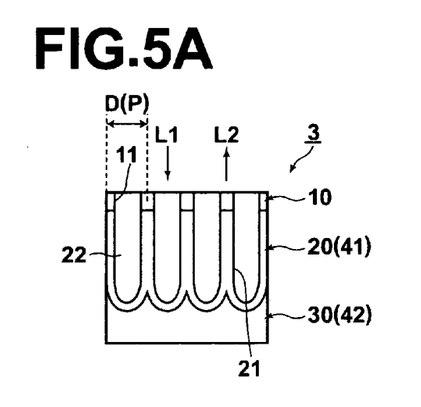
FIG. 5A is a thickness cross-sectional view of the display device according to a third embodiment of the present invention.
Figure 5B:
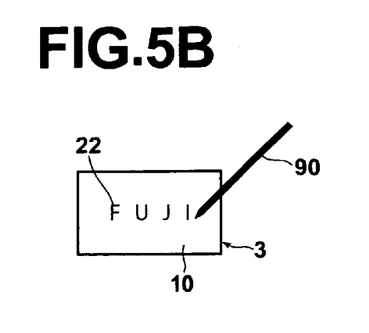
FIG. 5B is a top view of the display device shown in FIG. 5A, illustrating the device when displaying an image.

Hereinafter, the structure of the display device according to a third embodiment of the present invention will be described with reference to FIGS. 5A and 5B. The basic structure of the present embodiment is identical to that of the first embodiment. Therefore, identical components are given the same reference symbols and will not be elaborated upon further here. FIG. 5A is a cross-sectional view of the present embodiment corresponding to FIG. 2A in the first embodiment, and FIG. 5B is a top view (viewed from the side of the first reflector 10) of the display device shown in FIG. 5A, illustrating the device when displaying an image.

The display device 3 according to the present embodiment has a device structure that includes the following arranged from the light input side (upper side in FIG. 5A) in the order listed below: the first reflector 10; translucent porous body 20; and second reflector 30 as in the first embodiment. In the display device 3, however, the pores 21 of the translucent porous body 20 are not formed as through pores, and the second reflector 30 has a perfect reflection property. The pores 21 of the translucent porous body 20 are open only at the face on the side of the first reflector 10 and closed on the side of the second reflector 30.

The translucent porous body 20 is constituted by a metal oxide body ($Al_2O_3$) 41 obtained by anodizing a portion of an anodizable metal body 40 shown in FIG. 3. The second reflector 30 is constituted by the non-anodized portion (Al) 42 of the anodizable metal body 40 shown in FIG. 3, and the first reflector 10 is constituted by a metal layer made of, for example, gold or the like formed on the translucent porous body 20.

In the present embodiment, only a reflective type device in which the modulated light L2 is outputted from the first reflector 10 is obtained unlike in the first embodiment, since the second reflector 30 is a perfect reflector.

While in the display devices 1 and 2 according to the first and second embodiments, the average complex refractive index of the translucent porous body 20 is automatically regulated with respect to each of the display dots, the display device 3 according to the present embodiment displays an image by manually changing the average complex refractive index of the translucent porous body 20 for a given display dot. In the present embodiment, a single pore 21 of the translucent porous body 20 constitutes a single-dot D and a single pixel P.

The display device 3 according to the present embodiment is used in empty state in which no translucent material 22 is filled in the pores 21. As shown in FIG. 5B, a rod or pen shaped writing tool (e.g. swab) 90 or a finger tip is freely slid in an arbitrary pattern, such as a letter, symbol, figure, or the like, on the surface of the empty state display device 3 after dipping the tip of the writing tool or finger tip in the translucent material 22. This causes the translucent material 22 to be filled in the pores 21 of the arbitrary display dots D, and the absorption wavelength changes due to change in the average complex refractive index of the translucent porous body 20 where the translucent material 22 is filled. The area with pores filled with the translucent material 22 shows a contrast or color which is different from the other area (area with empty pores), and thereby the image is displayed. FIG. 5B shows an example in which letters "FUJI" are displayed. An image with various different colors may also be displayed by repeating the operation described above using a plurality of translucent materials 22 having different complex refractive indices.

There is no specific limitation on the translucent material 22, and those exemplified in the first embodiment may be used. If a highly volatile liquid, such as alcohol or alcohol aqueous solution is used, then the translucent material 22 filled in the pores 21 spontaneously vaporizes, and the display device returns to the original state relatively fast after the image is displayed. In this way, the display device may be repeatedly used with ease.

If the displayed image is desirable to be maintained, then a low volatile liquid, such as water or the like is used, and the surface of the display device 3 may be covered by, for example, a glass plate or the like to prevent the spontaneous vaporization of the liquid. In this case also, the display device 3 may be repeatedly used by removing the translucent material 22 by drying or the like.

The display device 3 according to the present embodiment allows images to be manually displayed in a simple manner as described above. Therefore it is suitable for use as a simple memo pad.

The display device 3 according to the present embodiment includes the following arranged from the light input side in the order listed below: the first reflector 10; translucent porous body 20; and second reflector 30 as in the first embodiment, in which the average complex refractive index of the translucent porous body 20 is changeable with respect to each display dot D. Consequently, the multipath interference condition is changeable with respect to each of the display dots D, and an image may be displayed by manually changing the optical modulation property with respect to each of the display dots D, and outputting the modulated light L2 according to the average complex refractive index of the translucent porous body 20.

The display device 3 according to the present embodiment that includes the translucent porous body 20 having a plurality of pores 21 arranged regularly, as in the first embodiment, has excellent in-plane uniformity of the optical modulation structure, which allows stable image display over the entire surface of the device. Further, the device has a strong absorption property for a particular wavelength due to multipath interference. This allows high resolution light modulation to be performed with respect to each of the display dots D. Further, the device has a structure which is substantially smaller than the wavelength of the input light L1 as the smallest light modulation unit, and a single display dot D is constituted by a single pore 21 having a diameter which is substantially smaller than the wavelength of the input light L1. Thus, according to the present embodiment, the display device 3 with high resolution and high display quality may be stably provided.

The display device 3 according to the present embodiment structurally has a wavelength selection capability as in the first embodiment, so that it may perform image display without using any polarizer, and provide full color display without using any color filter. That is, the display device 3 is a display device having higher light utilization efficiency than the conventional liquid crystal device.

The display device 3 according to the present embodiment has a structure in which the translucent porous body 20 is interposed between the two reflectors 10, 30, as in the first embodiment, which may be readily manufactured through anodization, and the display device 3 with an enlarged display area may also be readily manufactured.

The display device 3 according to the present embodiment structurally has a wavelength selection capability so that it is resistant to degradations (color degradation and the like) and has an excellent stability for long term use.

(Design Changes)

It will be appreciated that the present invention is not limited to the embodiments described above, and various design changes may be made without departing from the spirit of the present invention.

In the embodiments described above, only Al is cited as the major component of the anodizable metal body 40 used for forming the translucent porous body 20, but any material may be used as long as it is anodizable and the resultant metal oxide has translucency. For example, Ti, Ta, Hf, Zr, Si, In, Zn, and the like may be used other than Al. The anodizable metal body 40 may include two or more anodizable metals.

The use of the anodization allows the translucent porous body 20 having a plurality of pores 21 arranged regularly to be readily manufactured, and an enlarged display area may also be readily provided. Further, the translucent porous body 20 having structural regularity may be readily manufactured, so that the display device may have excellent in-plane uniformity of the optical modulation structure, which allows stable display over the entire surface of the device.

Thus, the use of anodization is desirable, but the present invention is not limited to this, and the display device of the present invention may be produced using other pore forming technologies. It may be produced, for example, by writing a pore pattern (through pores, or non-through pores (depression)) on a translucent base substance using the electronic writing technology, such as focused ion beam (FIB), electron beam (EB), or the like. Also, it may be produced by forming a translucent porous body having a given irregular pattern on the surface of a perfect reflective or a semi-transmissive and semi-reflective base substance using lithography technology. The use of the methods other than the anodization allows wider design flexibility in the selection of the material of the translucent porous body 20, the aperture pattern of the pores 21, and the like.

The material of the first reflector 10 and second reflector 30 is not limited to the metal, and any material may be used as long as it is reflective.

The pores of the translucent porous body 20 may have any shape. In the embodiments described above, only the substantially linear cylindrical pore is cited, but the pore may be shaped in triangular pole, square pole, or the like. Further, it is not limited to columnar shapes. The pores may have random shapes.

Further, the pores may be arranged in any pattern. A plurality of pores 21 may be arranged in one dimensional pattern or two dimensional pattern in the direction parallel to the light input face of the first reflector 10. The embodiments described above show an example case in which a plurality of pores 21 is arranged in two dimensional pattern in the direction parallel to the light input face of the first reflector 10. A three dimensional arrangement may also be employed in which a plurality of pores 21 is arranged in two dimensional pattern in the direction parallel to the light input face of the first reflector 10, and the two dimensional arrangement is repeated in the thickness direction. The pores 21 may be arranged randomly.

EXAMPLE

Hereinafter, an example of the present invention will be described.

EXAMPLE

<Manufacture of Display Device>

A display device according to the third embodiment was produced according to the following steps. First, an Al based anodizable metal body 40 was partially anodized to obtain the translucent porous body ($Al_2O_3$) 20 with a thickness d of 250 nm, and an aperture ratio for the pores 21 (total aperture area of the pores 21/total area of the translucent porous body 20) of ½. Thereby, a nanostructure constituted by the translucent porous body 20 and the second reflector 30 formed of the non-anodized portion (Al) was obtained (FIG. 3B). Then, gold is vapor deposited on the surface of the nanostructure to form the first reflector 10. Thereby, the reflective type display device 3 was obtained.

Complex refractive index of a substance differs according to the wavelength of the input light. Complex refractive indices of Au, $Al_2O_3$ and Al; the average complex refractive index of the first reflector 10; average complex refractive index of the translucent porous body 20 when the pores 21 are filled with air (refractive index n=1) instead of the translucent material 22 (condition 1 to be described later); and average complex refractive index of the second reflector 30 under a wavelength of 600 nm are listed below for reference. The average complex refractive index of the first reflector 10 is calculated in view of the aperture ratio of the pores 21. The average complex refractive index of the second reflector 30 is identical to that of Al, since the second reflector has no pore.

Complex Refractive Index of Au: 0.175-i3.10

Complex Refractive Index of $Al_2O_3$: 1.767

Complex Refractive Index of Al: 0.97-i6.00

Average Complex refractive Index of the First Reflector 10 $n_1$-$ik_1$: 0.725-i3.10

Average Complex refractive Index of Translucent Porous body 20 (empty state) $n_2$: 1.256

Average Complex refractive Index of the Second Reflector 30 $n_3$-$ik_3$: 0.97-i6.00

<Evaluation>

First, white light (from a xenon light source) was irradiated on the device 3 to measure the reflected light spectrum using M25 polychromator available from Bunkoh-Keiki Co., Ltd, with the pores 21 of the translucent porous body 20 being empty state in which no translucent material 22 is filled (being filled with air with a refractive index n=1) (Condition 1). The reflected light intensity was normalized with respect to the reflected light spectrum of alumina obtained separately.

Similar evaluations were conducted by filling different translucent materials 22 in all of the pores 21 of the translucent porous body 20. As for the translucent materials 22, water (refractive index n=1.33, Condition 2), and ethanol (100% pure, refractive index n=1.36, Condition 3) were used.

The average complex refractive indices of the translucent porous body 20 under the respective conditions were as follows: Condition 1: 1.256, Condition 2: 1.476, Condition 3: 1.496.

<Results>

Figure 6:
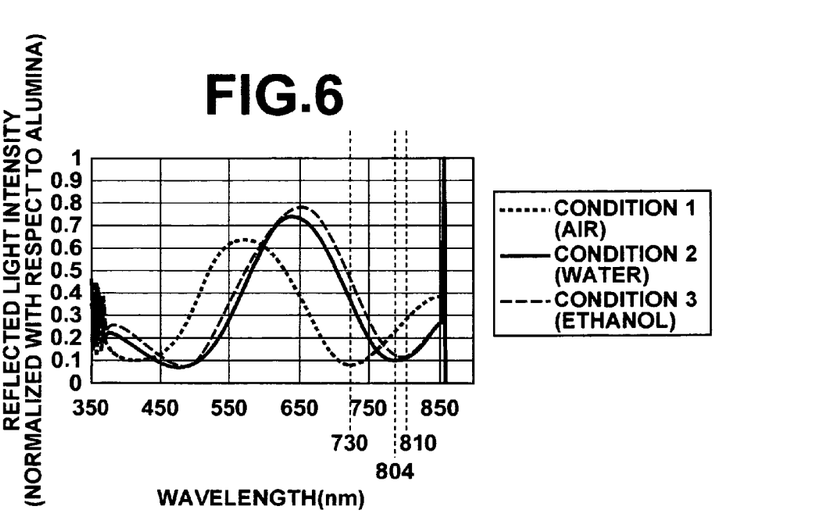
FIG. 6 is a drawing illustrating the evaluation results of a working example of the present invention

Reflected light spectra obtain are shown in FIG. 6. As shown in FIG. 6, in each of the cases in which the translucent porous body 20 is empty state where no translucent material 22 is filled in the pores 21 (filled with air, Condition 1), water filled state where water is filled in the pores (Condition 2), and ethanol filled state where ethanol is filled in the pores (Condition 3), absorption due to multipath interference was observed, and reflected light spectra having different absorption peak wavelengths depending on the conditions were obtained. The absorption wavelengths λ were 730 nm under Condition 1, 804 nm under Condition 2, and 810 nm under Condition 3. In Condition 1 and Condition 2, or in Condition 1 and Condition 3, reflected light having different colors was observed by the naked eye due to the difference in the absorption peak wavelengths.

The evaluation results described above show that a device that absorbs light having a particular wavelength according to the average complex refractive index of the translucent porous body 20 (in the example, the reflected light spectra are modulated light spectra when white light is inputted) may be obtained, and the average complex refractive index of the translucent porous body 20 may be readily changed by changing the type of translucent materials 22 filled in the pores 21 of the translucent porous body 20, thereby optical modulation property is readily changed.

As described in the third embodiment, an image such as a letter or the like was displayed on the device by freely sliding a swab wetted with water in an arbitrary pattern on the surface of the device with the pores being empty state. The use of ethanol instead of water showed the similar effect, that is, an image was displayed in the similar way.

<Application to Full Color Device>

When calculations are made by changing the thickness d of the translucent porous body 20 to 300 nm, 250 nm, and 220 nm with a wavelength of 600 nm, at least implicit absorption peak wavelengths λ may be obtained, which may be different from the actual absorption peak wavelengths though.

When the thickness d is 300 nm, the implicit absorption peak wavelength λ is 637.8 nm (corresponding to red light as the modulated light). When the thickness d is 250 nm, the implicit absorption peak wavelength λ is 531.47 nm (corresponding to green light as the modulated light). When the thickness d is 220 nm, the implicit absorption peak wavelength λ is 467.7 nm (corresponding to blue light as the modulated light).

Based on the calculation results, it was confirmed that a full color device may be obtained, for example, by changing the thickness d of the translucent porous body 20 of the example display device with respect to each of the display dots that output different color lights, and moving in and out the same or different translucent materials 22 with respect to each of the display dots.

INDUSTRIAL APPLICABILITY

The present invention may be applied to a display device for displaying an image.

What is claimed is:

1. A display device comprising the following arranged from light input side in the order listed below:
   a first reflector having a semi-transmissive and semi-reflective property;
   a translucent porous body having a plurality of pores in which a translucent material is filled, each of the pores having a substantially smaller diameter than the wavelength of input light; and
   a second reflector having a perfect reflection property, or a semi-transmissive and semi-reflective property, wherein:
   the average complex refractive index of the translucent porous body is changeable with respect to each display dot;
   the wavelength of light absorbed by the translucent porous body is changeable with respect to each display dot according to the average complex refractive index, and thereby the input light is modulatable; and
   the modulated light is outputted from the first reflector and/or the second reflector to perform image display.

2. The display device according to claim 1, wherein:
   the complex refractive index of the translucent material filled in the pores is changeable with respect to each display dot; and
   the average complex refractive index of the translucent porous body is changeable with respect to each display dot by changing the complex refractive index of the translucent material.

3. The display device according to claim 1, wherein:
   the type and/or amount of the translucent material filled in the pores is changeable with respect to each display dot; and
   the average complex refractive index of the translucent porous body is changeable with respect to each display dot by changing the type and/or amount of the translucent material.

4. The display device according to claim 3, wherein:
   the plurality of pores of the translucent porous body is open at the face on the side of the first reflector;
   the first reflector includes a plurality of through-holes, each communicating with each of the plurality of pores; and
   the translucent material is freely movable in and out of the pores through the through-holes with respect to each display dot.

5. The display device according to claim 4, wherein the pores are substantially linear pores extending from the side of the first reflector toward the side of the second reflector.

6. The display device according to claim 5, wherein a single display dot is constituted by a single pore.

7. The display device according to claim 5, wherein a single display dot is constituted by a plurality of pores.

8. The display device according to claim 4, wherein:
the translucent porous body is constituted by a metal oxide body obtained by anodizing a portion of an anodizable metal body;
the second reflector is constituted by the non-anodized portion of the anodizable metal body; and
the first reflector is constituted by a metal layer formed on the translucent porous body.

9. The display device according to claim 4, wherein:
the translucent porous body is constituted by a metal oxide body obtained by anodizing the entire portion of an anodizable metal body, or anodizing a portion of an anodizable metal body and removing the non-anodized portion thereof; and
each of the first and second reflectors is constituted by a metal layer formed on the translucent porous body.

10. The display device according to claim 3, wherein:
the plurality of pores of the translucent porous body is open at the face on the side of the second reflector;
the second reflector includes a plurality of through-holes, each communicating with each of the plurality of pores; and
the translucent material is freely movable in and out of the pores through the through-holes with respect to each display dot.

11. The display device according to claim 10, wherein the pores are substantially linear pores extending from the side of the first reflector toward the side of the second reflector.

12. The display device according to claim 11, wherein a single display dot is constituted by a single pore.

13. The display device according to claim 11, wherein a single display dot is constituted by a plurality of pores.

14. The display device according to claim 10, wherein:
the translucent porous body is constituted by a metal oxide body obtained by anodizing the entire portion of an anodizable metal body, or anodizing a portion of an anodizable metal body and removing the non-anodized portion thereof; and
each of the first and second reflectors is constituted by a metal layer formed on the translucent porous body.

* * * * *